US006481220B2

(12) United States Patent
Butler

(10) Patent No.: US 6,481,220 B2
(45) Date of Patent: Nov. 19, 2002

(54) CARCASS CHILLING PROCESS

(76) Inventor: Andrew Butler, 1062$^{th}$ Street, Brandon, M.B. (CA), R7A 4H4

( * ) Notice: Subject to any disclaimer, the term of this patent is extended or adjusted under 35 U.S.C. 154(b) by 0 days.

(21) Appl. No.: 09/986,510

(22) Filed: Nov. 9, 2001

(65) Prior Publication Data

US 2002/0139126 A1 Oct. 3, 2002

Related U.S. Application Data

(60) Provisional application No. 60/279,134, filed on Mar. 28, 2001.

(51) Int. Cl.$^7$ .......................... F25D 17/02; F25D 13/04
(52) U.S. Cl. .............................. 62/64; 62/65
(58) Field of Search .................. 62/63, 64, 65

(56) References Cited

U.S. PATENT DOCUMENTS

| 3,368,366 A | * | 2/1968 | Keeling | 62/64 |
| 3,715,891 A | * | 2/1973 | Martin | 62/63 |
| 4,028,774 A | | 6/1977 | Allan et al. | |
| 4,325,221 A | | 4/1982 | Grewar | |
| 4,367,630 A | | 1/1983 | Bernard et al. | |
| 4,810,515 A | | 3/1989 | Bourdel | |
| 4,940,599 A | | 7/1990 | Engler et al. | |
| 5,577,392 A | | 11/1996 | Engler et al. | |

FOREIGN PATENT DOCUMENTS

| CA | 2016939 | 2/1990 |
| NL | 9301244 | 7/1993 |
| WO | WO 99/21429 | 5/1999 |

OTHER PUBLICATIONS

Niels V. Juhl et al., "Immersion Pork Carcass Chilling", web page document, www.dmri.dk, Sep. 3, 1999, p. 1–10.
Patricia Barton Gade, "Effect of chilling process and lairage time on meat quality in heavy slaughter pigs", web page document from www.dmri.dk, Jul. 2, 1998, p. 1–5.
Susanne Støier et al., "Influence of the chilling process on the quality of pork", web page document from www.dmri.dk, Apr. 9, 1997, p. 1–6.

* cited by examiner

*Primary Examiner*—Ronald Capossela
(74) *Attorney, Agent, or Firm*—Michael R. Williams; Adrian D. Battison; Ryan W. Dupuis

(57) ABSTRACT

An approved method of chilling carcasses is described which results in less shrinkage and higher quality meat.

14 Claims, No Drawings

CARCASS CHILLING PROCESS

PRIOR APPLICATIONS

This application claims priority under 35 USC §119(e) to USSN 60/279,134, filed Mar. 28, 2001.

FIELD OF THE INVENTION

The present invention relates to a method and a system for chilling of carcass parts after slaughter.

BACKGROUND OF THE INVENTION

It is well known that during cooling of carcasses from the kill temperature to a temperature at which deterioration of the meat is substantially prevented, a fairly large volume of moisture may be lost from the carcasses. This moisture loss results in a loss of quality in the end product and a lower end weight of the product. A great deal of time and effort has therefore been expended to attempt to prevent moisture loss and meat deterioration.

One method taught in the prior art is known as crustfreezing, wherein the outermost layer of the carcass is frozen, thereby preventing a substantial amount of water loss. See for example, U.S. Pat. Nos. 4,028,774, 4,325,221 and 4,367,630. The main problem exhibited by crustfreezing is that it can result in color change, spoilage and/or freezer burn in the outer layers of the carcass. As can be seen, this method's ability to decrease moisture loss is limited. U.S. Pat. No. 4,810,515 teaches a method comprising moving carcasses through a refrigeration chamber on a conveyor belt system. The temperature of the refrigeration chamber ranges from −6° C. to +3° C. While on the conveyor belt, carcasses pass through from 10–50 "mist cabins" wherein the carcasses are sprayed with very fine droplets of liquid. The heat of the carcasses evaporates the droplets from the surface, thereby creating a high humidity level around the carcasses. Once the droplets have evaporated, the carcasses encounter the next "mist cabin". This evaporation and resulting humidity zone in turn prevents moisture loss.

PCT Application WO99/21429 teaches a method for chilling carcass parts comprised of submerging the carcass into a chilling medium, such as brine or slush ice. The carcass is enclosed in a foil or film prior to submersion in the chilling medium. Once removed from the chilling medium, the temperature of the carcass is allowed to equilibrate.

U.S. Pat. No. 4,940,599 teaches a method of chilling poultry carcasses comprised of subjecting carcasses to a cryogenic bath to lower the temperature of the carcass. Liquid is applied to the surface of the carcass either before or after the carcass is immersed in the cryogen, the end result being that freezing of the outermost layers of the carcass is prevented but an ice layer forms on the outer surface of the carcass. The carcass is then subjected to 10–15 minutes in a standard refrigeration chamber for further cooling, during which time the ice layer melts. As will be appreciated by one knowledgeable in the art, the thickness of the ice layer cannot be accurately controlled in this method, as the amount of moisture on the surface of the carcass will vary according to the delay between applying the liquid and subjecting the carcass to the supercold environment or removing the carcass from the supercold environment and applying the liquid.

U.S. Pat. No. 5,577,392 teaches a tunnel freezer for chicken carcasses which is comprised of spraying a cryogen such as liquid nitrogen or carbon dioxide snow directly onto the carcass as it travels through a tunnel having sufficient vortical flow therein such that the cryogen is circulated throughout the tunnel.

In some other methods, animal carcasses are chilled with cold air in an intensive process in which carcasses are suspended from gambrels and led through a chilling room while cold air is blown onto the carcasses. The intensive air chilling, also known as tunnel chilling, blast chilling or quick chilling, is distinguished by a low chilling loss and PSE-frequency. Specifically, this method comprises a first stage wherein the surface temperature of the carcass is lowered to near freezing by subjecting the carcass to a combination of low temperature and high wind velocity in order to prevent cell damage and deterioration of the carcass. The carcass then passes to a second stage wherein the temperature and conditions are more mild, which allows heat to be removed from the carcass while preventing the carcass from being "shocked" due to an abrupt temperature change. In the third zone, the conditions are even milder, allowing the carcass to recover from subjection to the supercold environment, prior to transfer to the traditional refrigeration unit. While this method produces adequate results in terms of preventing shrinkage and moisture loss while producing meat of good quality, improvements in the process can still be made. Clearly, an improved process for chilling carcasses wherein moisture loss is greatly reduced but high quality meat is obtained is needed.

SUMMARY OF THE INVENTION

The present invention is a method used during the processing of a carcass, in which it is subjected to a super cold, high air velocity environment (also known as "Quick Chill" or "Blast Chill").

While still in this "Quick Chill" environment, at a point where the surface temperature of the carcass is at near freezing, liquid is sprayed on the carcass, effectively snapping a controlled shell of ice onto the carcass. This is achieved by passing the carcass through one or more spray booths situated within the "Quick Chill Tunnel". Each booth contains a plurality of spray nozzles, which may be of various sizes and spray patterns.

This method produces a superior quality of meat, while virtually eliminating yield loss.

According to a first aspect of the invention, there is provided a method of chilling a carcass in which moisture loss is substantially eliminated and quality of meat is maintained comprising:

subjecting a carcass to a super cold environment such that the surface temperature of the carcass approaches freezing; and spraying a liquid onto the carcass such that the exterior and the cavity of the carcass are encased in ice, thereby preventing moisture loss and cell damage from the carcass.

The liquid may be water.

The liquid may be sprayed onto the carcass within the super cold environment.

The liquid may be sprayed onto the carcass by a plurality of nozzles substantially enclosed in a booth.

The thickness of the ice may be controlled.

The thickness of the ice may be controlled by the spray rate or by the quantity of liquid sprayed.

The liquid may be sprayed onto the carcass by a plurality of nozzles substantially enclosed in two or more booths.

DESCRIPTION OF THE PREFERRED EMBODIMENTS

Unless defined otherwise, all technical terms used herein have the same meaning as commonly understood by one of ordinary skill in the art to which the invention belongs. Although any methods and materials similar or equivalent to those described herein can be used in the practice or testing of the present invention, the preferred methods and materials are now described.

As used herein, "Quick Chill environment" or "super-cold environment" refers to an environment in which high velocity air is used to reduce the temperature of meat.

As will be seen, the present invention is described in connection with pork, but could be applied equally to other large carcass meats using the "Quick Chill" process of super cold, high velocity air.

Presently, the carcass is suspended from a gambrel and travels through a multistage "Quick Chill" environment, in which super cold, high velocity air used to reduce the temperature of the meat as quickly as possible. As well, in the present state, the carcass is sprayed prior to entering the "Quick Chill" environment, as is common practice in the industry.

Stage one of the "Quick Chill" environment is very intense in the refrigeration sense. Wind velocity combined with sensible temperature produces (watts) an environment wherein a crust forms on the surface of the carcass as quickly as possible. The quicker this is achieved, the less moisture is lost throughout the refrigeration process.

Stage two provides additional refrigeration effect in a less intense environment to help remove heat from the inside of the carcass but at the same time provides a gradual approach toward storage temperature condition, thereby reducing shock.

Stage three provides a gradual approach toward storage temperature conditions reducing shock which causes "black bone".

It is common knowledge that the use of the "Quick Chill" process as described generally above will at best result in a decrease of moisture loss to approximately one percent, but in doing so can also result in cell damage and a decrease in meat quality.

The present invention represents an improvement in the above-described method in that the carcass is sprayed with a liquid, for example, water, although other suitable liquids may also be used while within the super-cold environment.

Specifically, the carcass is brought into the first stage of the process on a gambrel. The combination of low temperature and high air currents act to reduce the surface temperature to near freezing. Once this occurs, and while still inside the "Quick Chill" environment, the carcass is passed through one or more spray booths, each containing a plurality of spray nozzles, wherein the exterior of the carcass as well as the exposed cavity are sprayed with a liquid. The applied liquid snaps an ice shell on all exposed surfaces of the carcass. As will be apparent to one knowledgeable in the art, the thickness of the shell can be controlled by changing the location of the spray booth or booths and by regulating the amount of liquid sprayed onto the carcass.

The result of the above process is a moisture loss of near zero percent, a greater heat release rate when lowering the internal temperature of the carcass, as well as significant improvements in color and meat quality. The ice shell is applied in the first stage, but remains on the carcass throughout the final stage, providing a more efficient heat transfer medium, while virtually eliminating moisture loss and maintaining a high quality of meat.

It is of note that in the above described embodiment, the carcass is not removed from the "Quick Chill" environment for spraying. Although it is possible to remove the carcass from the "Quick Chill" process for spraying, doing so would hinder the ability to effectively control the ice layer. However, it may be desirable in some embodiments to lower the temperature of the carcass to near-freezing by exposure to the super-cold environment and then remove the carcass from said environment to apply the liquid. As can be seen, in these embodiments, liquid would not necessarily have to be applied within a spray booth.

In some embodiments, the booth consists of sidewalls containing headers with spray nozzles in which the carcass passes through. It is configured in such a way that the entire carcass is sprayed with a liquid to encapsulate the carcass in an ice shell.

As discussed above, the basic "Quick Chill" process is known in the art and one example of the improved process is now described herein for illustrative purposes only. As will be appreciated by one knowledgeable in the art, the process will now be further described by way of example although the invention is not limited to the example. In addition, it is of note that the improvement described herein may be used in combination with other embodiments of "Quick Chill" methods.

EXAMPLE 1

As discussed above, in the first stage, the carcass is brought into a supercold environment, so that the temperature of the carcasses is lowered to near freezing. As discussed above, this prevents degradation and cell damage of the carcass; however, moisture loss and shrinkage also occurs during this stage of the process. This is accomplished by subjecting the carcasses to a combination of low temperature and high wind velocity. In some embodiments, the temperature in the first stage ranges from −10° F. to −30° F. with a wind equivalence of 0–3600 cfm. As will be apparent to one knowledgeable in the art, other combinations of wind and temperature or temperature alone may be used to achieve similar conditions. The combination of low temperature and air currents act to reduce the surface temperature of the carcass to near freezing. Once this occurs, the carcass is passed into an area having a sprayer wherein liquid is applied to the exterior of the carcass and the interior cavity of the carcass. For illustrative purposes only, it is noted that in the embodiment described above for the quick chill process, the spraying is performed approximately 6 minutes into the first stage. The applied liquid forms an ice shell around the carcass, thereby preventing moisture loss and protecting the exposed meat from freezing during the quick chill process so that a higher quality product is obtained. In some embodiments, the time of residence of the carcasses in the first stage is approximately 27 minutes. As will be apparent to one knowledgeable in the art, the time of residence is dependent upon the conditions and also on the desired result and may be varied accordingly.

In the second stage, the ice-encapsulated carcasses are passed to a zone having milder conditions wherein further heat loss from the carcass occurs. In some embodiments, the temperature in the second stage ranges from −10° F. to +5° F. with a wind equivalence of 0–3600 cfm. As will be apparent to one knowledgeable in the art, other combinations of wind and temperature or temperature alone may be used to achieve similar conditions. In some embodiments, the time of residence of the carcasses in the second stage is approximately 60 minutes. As will be apparent to one knowledgeable in the art, the time of residence is dependent upon the conditions and also on the desired result and may be varied accordingly.

In the third stage, the carcasses are passed to a zone having even milder conditions wherein further heat loss from the carcass occurs. In some embodiments, the temperature in the second stage ranges from 0° F. to +10° F. with a wind equivalence of 0–3600 cfm. As will be apparent to one knowledgeable in the art, other combinations of wind and temperature or temperature alone may be used to achieve similar conditions. In some embodiments, the time of residence of the carcasses in the second stage is approximately 14 minutes. As will be apparent to one knowledgeable in the art, the time of residence is dependent upon the conditions and also on the desired result and may be varied accordingly.

As discussed above, carcasses passed through this modified process produce meat that is firmer and has better color. Encasing the carcass in ice increases the heat release rate from the carcass, which in turn increases meat quality. Furthermore, the ice encasement prevents cell damage while decreasing yield loss. The encased carcass is then transported through the remainder of the quick chill process, for example, as described above.

As discussed above, the ice layer is formed during the cooling of the carcass. As a result of this arrangement, there is greater control over the thickness and uniformity of the ice layer. As will be appreciated by one knowledgeable in the art, the thickness can be varied for example by varying the spraying time, by adding additional spraying zones or by extending existing spraying zones. In some embodiments, the thickness of the ice layer may vary from 0.1 mm to 1 cm, from 0.1 to 4 mm, from 0.5 to 1 cm or from 0.5 mm to 4 mm. As will be appreciated by one knowledgeable in the art, the desired thickness of the ice layer will depend on many factors, for example, desired shrinkage and meat quality.

As will be appreciated by one knowledgeable in the art, the spray booth may be composed of any suitable material. Furthermore, the spray booth is arranged to accept the carcass therein and to substantially shield the carcass from wind and air currents during liquid application. As used herein, the term "nozzles" refers to elements arranged for applying water onto the carcass. As will be apparent to one knowledgeable in the art, the term "liquid"refers to any liquid which can be applied to the carcass as described above which will form an ice layer within the super-cold environment.

While the preferred embodiments of the invention have been described above, it will be recognized and understood that various modifications may be made therein, and the appended claims are intended to cover all such modifications which may fall within the spirit and scope of the invention.

What is claimed is:

1. A method of chilling a carcass In which moisture loss is substantially eliminated and quality of meat is maintained comprising:

lowering the surface temperature of a carcass such that the surface temperature of the carcass approaches freezing by subjecting the carcass to a super cold environment comprised of low temperature and high velocity air, and encasing the exterior and the cavity of the carcass in an ice shell by spraying a liquid onto the carcass, thereby preventing moisture loss from the carcass and cellular damage to the carcass.

2. The method according to claim 1 wherein the liquid is water.

3. The method according to claim 1 wherein the liquid is sprayed onto the carcass within the super cold environment.

4. The method according to claim 3 wherein the liquid is sprayed onto the carcass by a plurality of nozzles substantially enclosed in a booth.

5. The method according to claim 1 wherein thickness of the ice is controlled.

6. The method according to claim 5 wherein the thickness of the layer of ice is controlled by the spray rate.

7. The method according to claim 5 wherein the thickness of the ice is controlled by the quantity of liquid sprayed.

8. The method according to claim 1 wherein the liquid is sprayed onto the carcass by a plurality of nozzles substantially enclosed in one or more booths.

9. A method of chilling a carcass in which moisture loss is substantially eliminated and quality of meat is maintained comprising:

subjecting a carcass to a super cold environment such that the surface temperature of the carcass approaches freezing;

removing the carcass from said super cold environment;

spraying a liquid onto the exterior and the cavity of the carcass; and encasing the carcass in ice by returning the carcass to the super cold environment, thereby preventing moisture loss and cellular damage from the carcass.

10. The method according to claim 9 wherein the liquid is water.

11. The method according to claim 9 wherein the liquid is sprayed onto the carcass by a plurality of nozzles substantially enclosed in a booth.

12. The method according to claim 9 wherein thickness of the ice is controlled.

13. The method according to claim 12 wherein the thickness of the layer of ice is controlled by the spray rate.

14. The method according to claim 12 wherein the thickness of the ice is controlled by the quantity of liquid sprayed.

* * * * *